United States Patent
Cohen et al.

[11] Patent Number: 6,111,912
[45] Date of Patent: *Aug. 29, 2000

[54] METHOD AND APPARATUS FOR DETECTING THE SUB-RATE OF A PUNCTURED DATA PACKET FOR A MULTI-RATE TRANSMISSION SCHEME

[75] Inventors: Edith Cohen, Chatham; Hui-Ling Lou, Murray Hill, both of N.J.

[73] Assignee: Lucent Technologies Inc., Murray Hill, N.J.

[ * ] Notice: This patent issued on a continued prosecution application filed under 37 CFR 1.53(d), and is subject to the twenty year patent term provisions of 35 U.S.C. 154(a)(2).

[21] Appl. No.: 08/667,754

[22] Filed: Jun. 21, 1996

Related U.S. Application Data

[63] Continuation-in-part of application No. 08/555,737, Nov. 9, 1995, abandoned.

[51] Int. Cl.[7] .................................................. H04B 17/00
[52] U.S. Cl. ............................. 375/225; 375/340
[58] Field of Search .................... 375/224, 225, 375/377, 340, 341, 342, 365, 366, 368; 370/165, 252, 281, 253, 468, 335, 342, 320, 324; 340/825, 825.06

[56] References Cited

U.S. PATENT DOCUMENTS 5,566,206  10/1996  Butler et al. ............................. 375/225

OTHER PUBLICATIONS

"Mobile Station–Base Station Compatibility Standard for Dual–Mode Wideband Spread Spectrum Cellular Standard," *TIA/EIA Interim Standard 95* (Jul. 1993).

E. Cohen and H. Lou, "Multi–Rate Detection for the IS–95 CDMA forward traffic channels," IEEE Globecom '95 (Nov. 1995).

Personal Station/Base Station Compatibility Requirements for 1.8–2.0 GHz CDMA personal communication system, *ANSI J–STD–008*, (Mar. 1995).

H. Lou, "Implementing the Viterbi Algorithm," IEEE Signal Processing Magazine, vol. 12, No. 5, pp. 42–52 (Sep. 1995).

G.D. Forney Jr., "The Viterbi Algorithm," IEEE Proceedings, vol. IT–61, No. 3, pp. 268–278 (Mar. 1973).

*Primary Examiner*—William Luther

[57] ABSTRACT

A method for detecting the transmission sub-rate of a data packet whose symbols are punctured prior to transmission as with an IS-95 transmission with a 13 kbps speech encoder. Sub-rates are detected by first regrouping the received symbols so as to exclude those symbols for which one or more of its repetitions were punctured. The regrouped symbols are then examined for consecutive identical soft decision symbols, i.e., the repetitive pattern used by the transmitter to mask the sub-rate, with statistical methods used to account for the effects of noise and power bit insertion. The repetitive pattern is then matched to the appropriate sub-rate.

4 Claims, 2 Drawing Sheets

METHOD AND APPARATUS FOR DETECTING THE SUB-RATE OF A PUNCTURED DATA PACKET FOR A MULTI-RATE TRANSMISSION SCHEME

CROSS REFERENCE TO RELATED APPLICATION

This application is a continuation in part of U.S. patent application Ser. No. 08/555,737, filed on Nov. 9, 1995 and entitled "Method for Detecting The Sub-Rate of A Data Packet For a Multi-Rate Transmission Scheme" now abandoned. This application and the earlier filed application are commonly assigned.

FIELD OF THE INVENTION

The present invention relates generally to decoding a signal that is transmitted at an unknown sub-rate. In particular, the present invention teaches a method for detecting prior to decoding, the sub-rate of a received data packet punctured before it was transmitted.

BACKGROUND OF THE INVENTION

In the field of telecommunications, i.e., cellular and mobile phones, it is desirable to minimize the power necessary to transmit a signal. One popular approach is to transmit fewer bits over a given period of time during which there is no speech. The IS-95 Direct Sequence Code Division Multiple Access (DS-CDMS) system is one example of a system that allows the speech encoder rate to be reduced when the speech activity in the transmitter is low. IS-95 has become a U.S. digital cellular standard. A more detailed description of IS-95 can be found in TIA/EIA Interim Standard 95: *Mobile Station-Base Station Compatibility Standard For Dual Mode Wideband Spread Spectrum Cellular Standard,* (July 1993).

In the IS-95 forward traffic channel, i.e., from the base station to a mobile station, the speech information is transmitted at one of two data rates, either 8 kbps or 13 kbps, depending on the speech encoder. Focusing on the 13 kbps speech encoder each frame of data, or data packet, consists of 267, 125, 55 or 21 information bits corresponding to an information bit sub-rate of 13.35 kbps (sub-rate $R_1$), 6.25 kbps (sub-rate $R_2$), 2.75 kbps (sub-rate $R_3$) or 1.05 kbps (sub-rate $R_4$), respectively. The information bit rate varies from packet to packet depending on the speech activity. After adding a variety of bits to each packet, the data packets are then encoded by a rate ½ convolutional (channel) encoder and the encoded data are repeated twice, four times and eight times for the frames with 6.25 kbps, 2.75 kbps and 1.05 kbps, respectively so that every frame has 576 symbols. To ensure a 19.2 kbps transmission symbol rate with 384 symbols per frame for each of the four sub-rates, the same communication rate used with the 8 kbps speech encoder, two out of every six bits in each frame are punctured.

Since the receiver detects a constant symbol rate, the Viterbi decoder that decodes the data packets does not initially know which of the four sub-rates was used in the transmitter for any given data packet. One way to determine the correct sub-rate at the receiver is to use the Viterbi decoder to decode the packet according to each of the four possible encoding methods, and then select the decoded data packet that has the least number of errors.

The conventional method decodes the received sequence four times, using the Viterbi decoder, and then compares each bit in the decoded sequence for each sub-rate to the sign of the corresponding symbol in the received sequence. The sub-rate which corresponds to the decoded sequence having the least number of bit errors is selected. This method is computationally intensive. An alternative method is described and claimed in the related application referenced above. That method relies on recognizing patterns of repeated symbols to determine the sub-rate. The task of identifying sub-rates by recognizing repetitive patterns is complicated with speech encoder receivers that involve puncturing. Since symbols are removed from the data packet, the repetitive patterns are disturbed.

SUMMARY OF THE INVENTION

Accordingly, it is an objective of the present invention to provide an efficient method for detecting the transmission sub-rate of a data packet subject to puncturing prior to transmission. The multi-rate detection method of the present invention uses bit repetition properties as well as puncturing patterns in the data packets to determine the transmitted sub-rates. The symbols of each data packet are first regrouped so as to exclude symbols one or more of whose repetitions may have been punctured. The regrouped set of symbols are then examined for patterns of consecutive identical symbols and statistical methods are used to determine if the lack of identical symbols indicates a faster sub-rate, i.e., more information bits per packet, or a distorted slower sub-rate, i.e., fewer information bits per packet. Once the repetitive pattern is recognized, the sub-rate is known. The present invention can be used for both symbols using hard decision and soft decision. For soft decision symbols the method analyzes the degree of possible distortion. For symbols using hard decision, the number of repetitive symbols are examined.

DETAILED DESCRIPTION OF INVENTION

Figure 1:
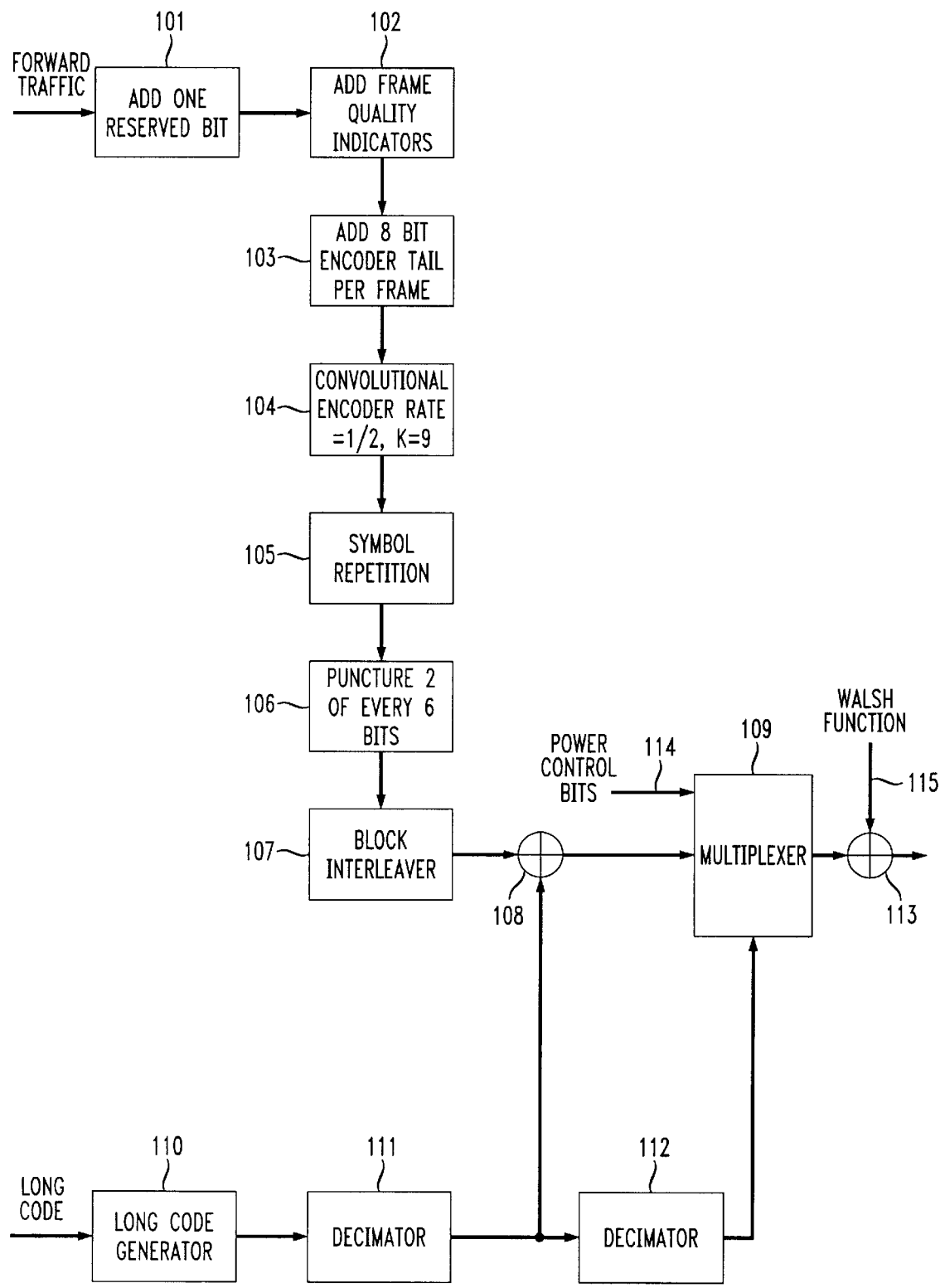
FIG. 1 illustrates a typical forward channel as used in the IS-95 scheme for 13 kbps speech encoder rate.
Figure 2:
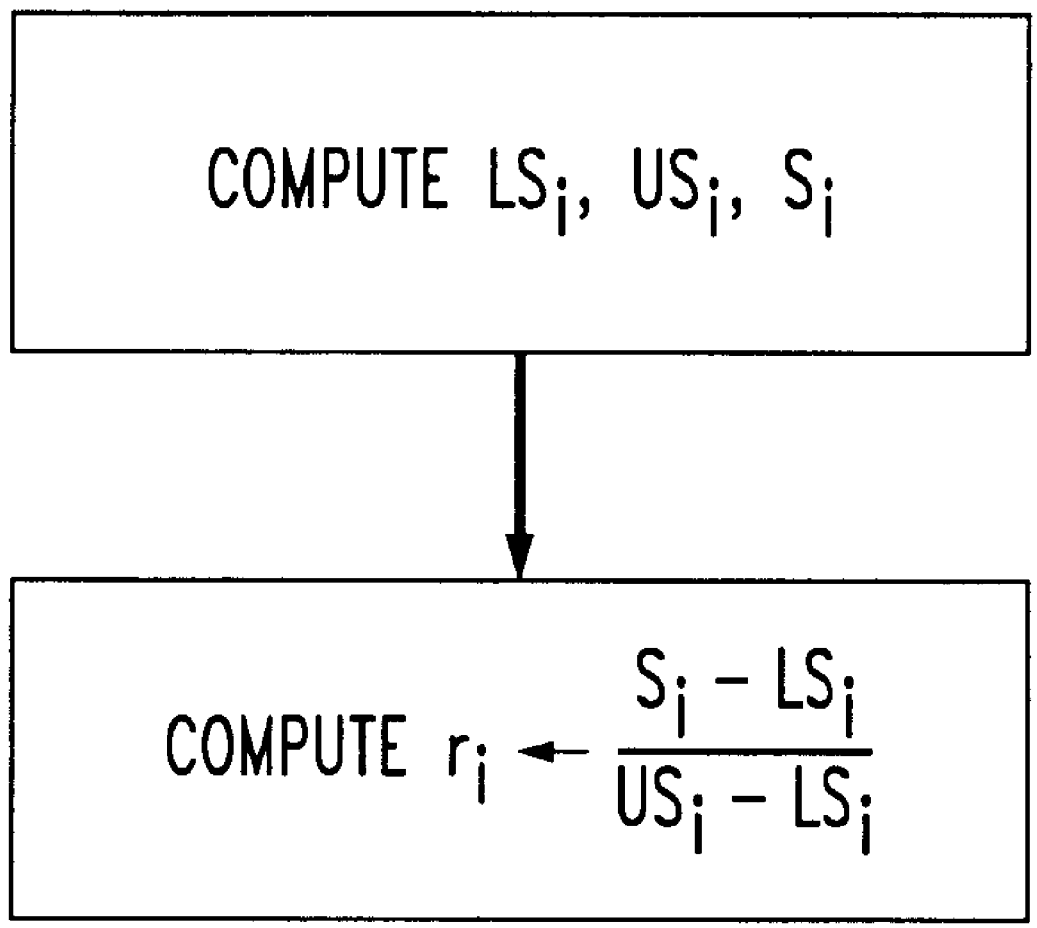
FIG. 2 illustrates a flow diagram of the algorithm implemented in the multi-rate detecting scheme of the invention.

Referring to FIG. 1, the transmitter system with the 13 kbps speech encoder is shown. In block (101), a reserved bit is added to each frame to indicate that a 13 kbps speech encoder is used. Each frame then receives a number of frame quality indicator bits for the receiver in block (102). Sub-rates $R_1$, $R_2$, $R_3$ and $R_4$ receive 12, 10, 8 and 6 frame quality bits, respectively. In block (103), eight more bits are added to the tail-end of each frame of bits to indicate the end of a frame.

At this point, the frame consists of a reserve bit, information bits, quality-indicator bits and tail-end bits, which are input to convolutional encoder (104). The convolutionally-encoded frame is then input to block (105) which repeats each of the bits in the frame a sufficient number of times so that each frame consists of 576 bits for a 28.8 kbps rate of transmission. At sub-rate $R_2$ the information bits are duplicated. At $R_3$ the information bits are quadrupled and at $R_4$ eight sets of information bits are included in a single data packet.

In block (106) each frame is punctured to remove two of every six bits. Although the puncture pattern may vary, in the IS-95 standard the third and fifth bits are removed, leaving 384 symbols in every frame for a transmission rate of 19.2 kbps. Each frame is then interleaved by block interleaver (107) to insure statistical independence of adjacent bits. Information from long code generator (110) and decimator (111) is used to scramble the data packet from the output of block interleaver (107). Through decimator (112) and multiplexer (109), some of the bits are replaced by power control bits to regulate the user's transmission power. The position of the power control bits can be reconstructed from the long code at the receiver.

Prior to puncturing in block (106) each data packet consists of pairs of identical bits, 4-tuples of bits, and 8-tuples of bits, for sub-rates $R_2$, $R_3$ and $R_4$, respectively. A tuple as used here refers to a string of consecutive identical bits. The encoded packets are "random" in the sense that absent the redundancy of the multi-rate transmission scheme, the probability that the encoder outputs a 0,0; 0,1; 1,0; or 1,1 pair, is about the same. In particular, the pairs 0,1; 1,0 are about as likely as the pairs 0,0; 1,1. Similarly, where logical 0 and 1 are mapped to positive and negative values, it is unlikely, over a sufficiently large sample, to have consecutive like sign values unless duplication is present. Hence, it is very unlikely that a packet of sub-rate $R_1$ where the bits are not repeated for purposes of maintaining a constant transmission rate, will consist of pairs of identical bits (like-sign) and be mistaken for a slower sub-rate packet. Similarly for sub-rates $R_2$ and $R_3$, it is unlikely that a packet of bits will consist of a sequence of four or eight tuples of bits, respectively, and be mistaken for a slower sub-rate packet. Therefore, by observing the absence or presence of identical bits, a receiver can properly identify the correct information data sub-rate.

For real systems, however, puncturing, power bit insertions and the presence of noise, make sub-rate detection more difficult. For instance, nonidentical bits in a given tuple can be an indication of either a relatively faster sub-rate packet, or a relatively slower sub-rate packet subject to noise. To determine the correct information data sub-rate for a real system, statistical methods are used. To account for puncturing, the symbols must be regrouped.

As stated above, the IS-95 standard with a 13 kbps speech encoder punctures every third and fifth symbol of every set of six symbols. This scheme is described more fully in a document entitled "Telecommunications Service Bulletin-74," hereby incorporated by reference as if fully set forth herein. Knowing the puncturing pattern, it is possible to take into consideration those symbols that were punctured so that one can distinguish between a repetitive pattern indicating a faster sub-rate and distorted by the puncturing, from a repetitive pattern indicating a slower sub-rate. For example, for sub-rate $R_2$, where each symbol is duplicated, a set of six symbols represents three symbols at the speech encoder end. In other words, $a_1$ $a_2$ and $a_3$, prior to puncturing, will appear as $a_1 a_1$ $a_2 a_2$ $a_3 a_3$. Since the third and fifth bits are punctured the transmitted set of symbols will appear as $a_1 a_1$ $a_2$ $a_3$. Thus, it is apparent that from every four received bits, only the first two bits will indicate a repetitive pattern according to sub-rate $R_2$. Similarly, it can be shown that for sub-rate $R_3$, the repetitive pattern of the received symbols repeat after every eight received symbols. There will be three consecutive $a_1$'s, three consecutive $a_2$s, and two consecutive $a_3$s. Likewise for a repetitive pattern according sub-rate $R_4$, the pattern will repeat itself after every 16 received symbols with six consecutive $a_1$'s, five consecutive $a_2$s, and five consecutive $a_3$s.

To determine the presence or absence of identical bits according to the present invention, the sub-rates are distinguished one at a time. An efficient sequence for distinguishing the possible sub-rates starts by eliminating either the fastest or slowest sub-rate, and examining the remaining sub-rates in increasing or decreasing order, respectively. For example, the first step to examine the sub-rates in decreasing order, is to determine whether the first two symbols of every four symbols are identical. If pairs of identical symbols are not present, i.e., there is no duplication, the data packet sub-rate is identified as $R_1$. If, however, consecutive identical symbols are found, a second step is implemented and the data packet is examined for the repetitive pattern associated with $R_3$ as stated above. If the $R_3$ repetitive pattern is not found, it is known that the data packet was transmitted at $R_2$. If the $R_3$ repetitive pattern is identified, steps similar to the proceeding steps are implemented to distinguish between sub-rates $R_3$ and $R_4$.

For receivers using soft decision symbols for detection, the noise information inherent in the soft values of each symbol in the packet is used to identify the repetitive pattern of the data packet and thereby help detect the sub-rate. The power control bits may be ignored by setting their value to zero to simplify the multi-rate detection without adversely affecting the ultimate decision of the Viterbi decoder.

To identify the repetitive patterns of the punctured data packet, three sets of four variables are computed: $S_i$, $LS_i$, $US_i$ and $r_i$. For the first step, the first variable, $S_1$, is set equal to the sum of the absolute value of the sum of the first two consecutive symbols for every set of four symbols in the data packet, excluding power bits. In other words, $S_1 \leftarrow S_1 + |b_{4i}+b_{4i+1}|$. The second variable, $LS_1$, is set equal to the absolute value of the difference between the absolute value of the first two consecutive symbols in each set of four symbols in the data packet, excluding power bits. In other words, $LS_1 \leftarrow LS_1 + ||b_{4i}|-|b_{4i+1}||$. The third variable, $US_1$, is set equal to the sum of the absolute value of the first two consecutive symbols in each set of four symbols in the data packet, excluding power bits. In other words, $US_1 \leftarrow US_1 + |b_{4i}|+|b_{4i+1}|$. From these three variables, a fourth variable $r_1$ is set equal to the ratio of the difference between $S_1$ and $LS_1$ to the difference between $US_1$ and $LS_1$. In other words, $$r_1 \leftarrow S_1-LS_1/US_1-LS_1.$$

It is clear from these variables that where two identical bits share the same sign, the value of $S_1$ approaches the value of $US_1$ and, consequently, $r_1$ approaches 1. On the other hand, if the signs of each of the received bits are random, as is approximately the case for sub-rate $R_1$, the expected value of $S_1$ would be one half the sum of $US_1$ and $LS_1$, which leads to $r_1$ equal to 0.5. Accordingly, if $r_1$ approaches 1, it is very likely that the data packet was transmitted at a rate greater than sub-rate $R_1$.

Where $r_1$, approaches 1, it becomes necessary to implement the second step to determine whether the data packet was transmitted at sub-rate $R_2$, $R_3$, or $R_4$. Four variables, similar to those computed for $r_1$ are computed to determine a second ratio $r_2$. $S_2$ is set equal to the sum of the absolute value of the first three symbols, the following three symbols and the following two symbols, over all sets of eight symbols in the data packet, excluding power bits, i.e., $S_2 \leftarrow S_2+|b_{8i}+b_{8i+1}+b_{8i+2}|+|b_{8i+3}+b_{8i+4}+b_{8i+5}|+|b_{8i+6}+b_{8i+7}|$. $LS_2$ is computed as $LS_2 \leftarrow LS_2+||b_{8i}+b_{8i+1}|-|b_{8i+2}||+||b_{8i+3}|-|b_{8i+4}+b_{8i+5}||+||b_{8i+6}|-b_{8i+7}||$, and $US_2$ is computed as $US_2 \leftarrow US_2+|b_{8i}+b_{8i+1}|+|b_{8i+2}|+|b_{8i+3}|+|b_{8i+4}+b_{8i+5}|+|b_{8i+6}|+b_{8i+7}|$. Finally, $r_2$ is set equal to the ratio of the difference between $S_2$ and $LS_2$ to the difference between $US_2$ and $LS_2$, i.e., $$r_2 \leftarrow \frac{S_2 - LS_2}{US_2 - LS_2}.$$

As with $r_1$, where $r_2$ equals or approaches 1, the likelihood is that the data packet was transmitted with four consecutive identical bits for each information bit. On the other hand, where $r_2$ approaches 0.5, the likelihood is that the data packet was transmitted at sub-rate $R_2$ with only two consecutive identical bits.

If $r_2$ approaches 1, indicating that the data packet was transmitted with four identical consecutive bits, the next step is implemented to determine whether the data packet was transmitted at sub-rate $R_3$ or at sub-rate $R_4$. Here too, variables $S_3$, $LS_3$, $US_3$ and $r_3$, are computed with the summations over sets of sixteen consecutive symbols. In mathematical form the variables $S_3$, $LS_3$, $US_3$ and $r_3$ appear as follows:

$$S_3 \leftarrow S_3 + \left|\sum_{j=16i}^{16i+5} b_j\right| + \left|\sum_{j=16i+6}^{16i+10} b_j\right| + \left|\sum_{j=16i+11}^{16i+15} b_j\right|;$$

$$LS_3 \leftarrow LS_3 + \left\|\left|\sum_{j=16i}^{16i+2} b_j\right| - \left|\sum_{j=16i+3}^{16i+5} b_j\right|\right\| +$$

$$\left\|\left|\sum_{16i+6}^{16i+7} b_j\right| - \left|\sum_{16i+8}^{16i+10} b_j\right|\right\| + \left\|\left|\sum_{16i+11}^{16i+13} b_j\right| - \left|\sum_{16i+14}^{16i+15} b_j\right|\right\|;$$

$$US_3 \leftarrow US_3 + \left|\sum_{j=16i}^{16i+2} b_j\right| + \left|\sum_{j=16i+3}^{16i+5} b_j\right| + \left|\sum_{16i+6}^{16i+7} b_j\right| +$$

$$\left|\sum_{16i+8}^{16i+10} b_j\right| + \left|\sum_{16i+11}^{16i+13} b_j\right| + \left|\sum_{16i+14}^{16i+15} b_j\right|;$$

$$\text{and} \quad r_3 \leftarrow \frac{S_3 - LS_3}{US_3 - LS_3}.$$

Where $r_3$ is close to 0.5, the sub-rate is most likely to be $R_3$ with four identical consecutive bits. If, however, $r_3$ approaches 1, the sub-rate is most likely $R_4$ with eight identical consecutive bits.

To further fine tune the method of the present invention, the sub-rates can be determined more accurately by keying the ratios $r_1$, $r_2$ and $r_3$ to predetermined thresholds, $T_1$, $T_2$ and $T_3$ which may or may not equal 0.5 or 1. Appropriate values for $T_1$, $T_2$ and $T_3$ are determined through histograms of values of $r_1$, $r_2$ and $r_3$ for each sub-rate from tests run on the particular system of interest. The histograms are formed by running the Viterbi decoder at each of the sub-rates $R_i$, computing their respective $r_i$ for each packet, and plotting the number of packets by their respective $r_i$ value. Most of the packets will have values close to 0.5 with some deviation. Others will have slightly higher values. However, very few packets of a sub-rate $R_i$ are expected to have a value of $r_i$ close to 1.0.

From the histograms, thresholds can be set according to the particular tradeoffs between a defined noise level and a tolerable misclassification rate. $T_i$ is determined by considering both the cutoff of $r_i$ where the decoder operates at sub-rate $R_i$ and the cutoff of $r_i$, where the decoder assumed sub-rate $R_{i+1}$. For example, for $T_1$, the histogram for $r_1$ from the decoder operating at $R_1$ is examined for the value of $r_1$ at which very few packets are received. This number will be close to 0.5 but could be greater. Next, the histogram of $r_1$ from the decoder operating at $R_2$ is examined. $T_1$ is chosen to be some value between the $r_1$ cutoff values of both histograms.

For IS-95, it is preferred that the absolute misclassification error rate be less than 0.5% on the range of noise levels and sub-rates where the Viterbi decoder performs well. In addition, the frame error rate due to misclassification should be small relative to the frame error rate that occurs due to the Viterbi Decoder. Note that the noise level that the Viterbi Decoder tolerates increases for lower sub-rates. Indeed, for $R_4$ packets, the decoder tolerates such a high noise level that the bit-signs look almost random and can be confused with $R_1$.

It is important to recognize that the method of the present invention does not decode the received signal. Rather the sub-rate is detected and passed on to the Viterbi decoder. Accordingly, it is of little concern to accurately detect the sub-rate in a range of noise where the Viterbi decoder will not be able to accurately decode the received signal even knowing the correct sub-rate.

The method of the present invention can be further enhanced by using more complex conditions, involving more than one of the $r_i$'s at a time. To illustrate how examining each $r_i$ independently can lead to misclassification, consider the case where the expected value of $r_3$ is 0.5, so that the rate may be $R_1$, $R_2$ or $R_3$. However, if the actual sub-rate is $R_1$, the quantities $S_3$, $LS_3$, and $US_3$ have relatively small values as a result of the high level of randomness of eight consecutive symbols, leading to a threshold $T_3$ having a larger standard deviation and therefore more likely to have large values. Therefore, by considering $r_3$ alone, there is a wider range where $R_1$ packets can be confused with noisy $R_3$ and $R_4$ packets. To compensate for this situation, when the value of $r_3$ is in the ambiguous range, the enhanced method classifies the transmission rate based on the values of $r_1$ and $r_2$ as well. The same behavior and correction happen for the parameter $T_2$ when the sub-rates are $R_1$ and $R_2$.

One embodiment of the present invention, enhanced as described above, and based on histograms of experiments in Rayleigh-Fading and Gaussian environments, considers the magnitude of $US_1$, which is correlated with the noise level, i.e., smaller when the noise level is low. The Rayleigh Fading Model is described more fully in W. C. Jakes, *Microwave Mobile Communications* (John Wiley & Sons 1974), hereby incorporated by reference as if fully set forth herein. Different environments will lead to different histograms. One skilled in the art will be readily able to determine appropriate threshold values for fine-tuning the method of the present invention to a particular system of interest through methods known in the art.

In this embodiment, $r_3$ is examined first. If $r_3$ is greater than or equal to 0.78, the transmission sub-rate is identified as $R_4$. If $r_3$ is less than 0.78 but equal to or greater than 0.73, the transmission sub-rate is identified as $R_4$, unless, either the difference between $r_2$ and $r_3$ is greater than or equal to 0.1 in which case the sub-rate is identified as $R_3$; the sum of $r_1$, $r_2$, and $r_3$ is less than 1.88, in which case the sub-rate is identified to $R_1$; or the difference between $r_1$ and the sum of $r_2$ and $r_3$ is less than or equal to 0.5, in which case the sub-rate is $R_2$.

If $r_3$ is less than 0.73 but greater than or equal to 0.68, the following parameters are used to determine the sub-rate. If the difference between $r_2$ and $r_3$ is greater than 0.1, the sub-rate is $R_3$. Otherwise, if the sum of $r_1$, $r_2$ and $r_2$ is less than or equal to 1.88, the sub-rate is $R_1$. If the difference between $r_1$ and the sum of $r_3$ and $r_2$ is less than or equal to 0.46 the sub-rate is $R_2$. If none of the above conditions exist, the sub-rate is $R_4$.

If $r_3$ is less than 0.68 but equal to or greater than 0.63, the following parameters apply. If the sum of $r_1$, $r_2$ and $r_3$ is less than or equal to 1.86 the sub-rate is $R_1$. If the difference between $r_2$ and $r_3$ is greater than or equal to 0.08, the sub rate is $R_3$. If the difference between $r_1$ and the sum of $r_2$ and $r_3$ is less than or equal to 0.44, the sub rate is $R_2$. If none of these parameters are true the sub-rate is $R_4$.

If $r_3$ is less than 0.63 and $r_2$ is greater than or equal to 0.71 the sub-rate is $R_3$. If however, $r_2$ is less than 0.71 but greater than or equal to 0.64 the following parameters apply. If $r_1$ is greater than or equal to $r_2+0.15$, the sub-rate is $R_2$. If the sum of $r_1$ and $r_2$ is less than or equal to 1.28 the sub-rate is $R_1$ otherwise, the sub-rate is $R_3$.

If $r_2$ is less than 0.64, but $r_1$ is greater than or equal to 0.74, the sub-rate is $R_2$. If $r_1$ is less than 0.74 but greater than or equal to 0.7 and US, is less than 410, the sub-rate is $R_2$. If none of the above conditions exist, the sub-rate is $R_1$.

An alternative method for improving the rate classification is to use the fact that if sub-rate $R_4$ is transmitted, only ⅛ of the power is transmitted, compared to the power transmitted for sub-rate $R_1$. Thus, if the received power is very low, it is either because the signal has gone through a deep fade or sub-rate $R_4$ is transmitted. In this case, a different set of threshold values, biased toward $R_4$, can be used since even if a greater rate was transmitted, the signal, having gone through a deep fade, will be so noisy that the Viterbi decoder will not be able to correctly decode the sequence for the higher sub-rate.

An alternative method for improving rate classification is to use the multi-path information available with IS-95 to bias the threshold accordingly. In IS-95 the receiver picks up the strongest signal and looks for echoes of that signal offset by some time delay, to reconstruct an even stronger signal. For each echo used in addition to the primary signal, the statistics corresponding to each sub-rate will differ. Thus different thresholds can be used depending on the number of echoes, or paths used to detect the signal.

The present invention can also be used to partially detect the transmission sub-rate of a data packet. In other words, one or more possible sub-rates can be excluded rather than identifying the precise sub-rate. For example, the techniques described above may be used to recognize that the sub-rate is not $R_1$ or $R_2$, while not identifying whether the sub-rate is $R_3$ or $R_4$. With this implementation, one can use the Viterbi decoder to decode the data packet assuming $R_3$ and to decode the packet assuming $R_4$ and identifying the precise sub-rate by selecting the decoded output the passes the frame quality indicator test.

The multi-rate detection scheme of the present invention is more efficient than the conventional scheme. For a packet with 384 symbols, the soft-decision multi-rate detection technique requires up to 573 additions, and 374 absolute value operations to compute $S_1$, $LS_1$ and $US_1$. Similarly, 909 add and 576 absolute value operations are required to compute $S_2$, $LS_2$ and $US_2$, and 669 add and 288 absolute value operations are required to compute $S_3$, $LS_3$ and $US_3$. To compute $r_1$, $r_2$ and $r_3$, 6 addition and 3 division operations are required. Thus, a total of 2154 addition, 1248 absolute value and 3 division operations are required for the most straightforward implementation of the algorithm. This count includes adding zeros and the power bits that may be avoided depending on the hardware implementation. In addition, a few comparison operations may also be required depending on the classification rules.

As shown in FIG. 6, the conventional method decodes the received sequence four times, using the Viterbi decoder, and then compares each bit in the decoded sequence for each sub-rate to the sign of the corresponding symbol in the received sequence. The sub-rate which corresponds to the decoded sequence that has the least number of bit errors compared to the received sequence is selected. To decode one frame of $R_1$, the Viterbi decoder has to go through 288 iterations since there are 288 information bits in the frame. Similarly, the Viterbi decoder has to go through 144, 72 and 36 iterations to decode sequences of sub-rates $R_2$, $R_3$ and $R_4$ respectively. For each iteration, just to update the survivor path alone, the Viterbi decoder requires 512 additions and 256 comparison operations. This does not include branch metric computations, updating the optimum paths, path trace back and the comparison between the decoded bit sequence to the received sequence of symbols. Thus, the number of computations required by the soft-decision multi-rate detector is very small compared to that of decoding one frame of data using the Viterbi algorithm.

If sub-rate $R_1$ is selected by the multi-rate detector, the Viterbi algorithm is used once to decode the $R_1$ sequence. Thus, 288 iterations are required to decode the sequence. If sub-rate $R_4$ is selected, only 36 iterations are required to decode the sequence. As a result, the multi-rate detector 100 can increase the throughput by a factor of two to fourteen, depending on the speech encoder sub-rate used. Furthermore, for the shorter sequences, $R_2$, $R_3$ and $R_4$, the decoder can be turned off once the decoding is done. This reduces the power consumed by the decoder.

The foregoing merely illustrates the principles of the present invention. Those skilled in the art will be able to devise various modifications, which although not explicitly described or shown herein, embody the principles of the invention and are thus within its spirit and scope.

What is claimed is:

1. A method for detecting a data sub-rate of a transmitted data packet comprising a plurality of symbols, said plurality of symbols comprising symbols of a data block wherein said data sub-rate is one of four possible sub-rates, a first sub-rate corresponding to a first pattern, where the data packet comprises symbols of said data block, a second sub-rate corresponding to a second pattern wherein the data packet comprises symbols of said data block with each said data block symbol repeated consecutively one additional time resulting in arrangements of pairs of consecutive identical symbols in the data packet, a third sub-rate corresponding to a third pattern wherein the data packet comprises symbols of said data block with each said data block symbol repeated consecutively three additional times resulting in arrangements of quartets of consecutive identical symbols in the data packet, a fourth sub-rate corresponding to a fourth pattern wherein the data packet comprises symbols of said data block with each said data block symbol repeated consecutively seven additional times resulting in arrangements of octets of consecutive identical symbols in the data packet, and wherein the data packet is punctured prior to a transmission so as to remove every third and fifth symbol from every set of six symbols, said method comprising the steps of:

regrouping said plurality of symbols of said transmitted data packet so as to exclude punctured symbols;

determining a particular pattern of said regrouped symbols of said transmitted data packet by computing variables based on said first, second, third and fourth patterns and comparing said variables to respective threshold values, each threshold value correlated to one of said four possible sub-rates;

identifying, after said computing and comparing steps, the sub-rate which corresponds to said particular pattern of said regrouped symbols of said transmitted data packet, wherein said computing step comprises the steps of:

computing 3 sum variables $S_1$, $S_2$, and $S_3$, one sum variable for each sub-rate other than said first sub-rate;

computing 3 lower-limit variables $LS_1$, $LS_2$, and $LS_3$, one lower-limit variable for each sub-rate other than said first sub-rate;

computing 3 upper-limit variables $US_1$, $US_2$, and $US_3$, one upper-limit variable for each sub-rate other than said first sub-rate;

computing 3 discriminator variable $$r_1 = \frac{S_1 - LS_1}{US_1 - LS_1}, \qquad r_2 = \frac{S_2 - LS_2}{US_2 - LS_2},$$

and $$r_3 = \frac{S_3 - LS_3}{US_3 - LS_3},$$

one discriminator variable for each sub-rate other than said first sub-rate; and recognizing a particular pattern, of said first, second, third, or fourth patterns, present in said data packet from said 3 discriminator variables.

2. A method according to claim 1 wherein $S_1$ corresponding to said second sub-rate is set equal to $$\sum_{i=0}^{n/4-1} |b_{4i} + b_{4i+1}|,$$

$LS_1$ corresponding to said second sub-rate is set equal to $$\sum_{i=0}^{n/4-1} ||b_{4i}| - |b_{4i+1}||,$$

and $US_1$ corresponding to said second sub-rate is set equal to $$\sum_{i=0}^{n/4-1} (|b_{4i}| + |b_{4i+1}|),$$

where n is the number of symbols in said transmitted data packet less excluded punctured symbols, wherein $S_2$ corresponding to said third sub-rate is set equal to $$\sum_{i=0}^{n/8-1} (|b_{8i} + b_{8i+1} + b_{8i+2}| + |b_{8i+3} + b_{8i+4} + b_{8i+5}| + |b_{8i+6} + b_{8i+7}|),$$

$LS_2$ corresponding to said third sub-rate is set equal to $$\sum_{i=0}^{n/8-1} (||b_{8i} + b_{8i+1}| - |b_{8i+2}|| + ||b_{8i+3}| - |b_{8i+4} + b_{8i+5}|| + ||b_{8i+6}| - |b_{8i+7}||)$$

and $US_2$ corresponding to said third sub-rate is set equal to $$\sum_{i=0}^{n/8-1} (|b_{8i} + b_{8i+1}| + |b_{8i+2}| + |b_{8i+3}| + |b_{8i+4} + b_{8i+5}| + |b_{8i+6}| + |b_{8i+7}|),$$

where n is the number of symbols in said transmitted data packet less number of excluded punctured symbols, and wherein $S_3$ corresponding to said fourth sub-rate is set equal to $$\sum_{i=0}^{n/16-1} \left( \left| \sum_{j=16i}^{16i+5} b_j \right| + \left| \sum_{j=16i+6}^{16i+10} b_j \right| + \left| \sum_{j=16i+11}^{16i+15} b_j \right| \right),$$

$LS_3$ corresponding to said fourth sub-rate is set equal to $$\sum_{i=0}^{n/16-1} \left( \left| \left| \sum_{j=16i}^{16i+2} b_j \right| - \left| \sum_{j=16i+3}^{16i+5} b_j \right| \right| + \left| \left| \sum_{j=16i+6}^{16i+7} b_j \right| - \left| \sum_{j=16i+8}^{16i+10} b_j \right| \right| + \left| \left| \sum_{j=16i+11}^{16i+13} b_j \right| - \left| \sum_{j=16i+14}^{16i+15} b_j \right| \right| \right)$$

and $US_3$ corresponding to said fourth sub-rate is set equal to $$\sum_{i=0}^{n/16-1} \left( \left| \sum_{j=16i}^{16i+2} b_j \right| + \left| \sum_{j=16i+3}^{16i+5} b_j \right| + \left| \sum_{j=16i+6}^{16i+7} b_j \right| + \left| \sum_{j=16i+8}^{16i+10} b_j \right| + \left| \sum_{j=16i+11}^{16i+13} b_j \right| + \left| \sum_{j=16i+14}^{16i+15} b_j \right| \right),$$

where n is the number of symbols in said transmitted data packet less number of excluded punctured symbols.

3. A method according to claim 2 wherein said comparing step involves comparing said 3 discriminator variables with 3 threshold variables $T_1$, $T_2$, and $T_3$, wherein said 3 threshold variables $T_1$, $T_2$, and $T_3$, are determined from statistical evaluations of said discriminator variables.

4. A method according to claim 2 wherein $r_1$ having a value approximately 0.5 indicates said first pattern, $r_1$ having a value approximately 1.0 indicates one of said second, third, or fourth patterns, $r_2$ having a value approximately 0.5 indicates said second pattern, $r_2$ having a value approximately 1.0 indicates one of said third or fourth patterns, $r_3$ having a value approximately 0.5 indicates said third pattern, $r_3$ having a value approximately 1.0 indicates said fourth pattern.

* * * * *